(12) United States Patent
Dominic et al.

(10) Patent No.: US 7,350,269 B2
(45) Date of Patent: Apr. 1, 2008

(54) ADJUSTABLE CASTER AND LEVELING ASSEMBLY

(76) Inventors: Dennis Paul Dominic, 10231 Amber Hue La., Las Vegas, NV (US) 89144; Joe Edwin Lucas, 801 Hillside Ave., Elmhurst, IL (US) 60126

( * ) Notice: Subject to any disclaimer, the term of this patent is extended or adjusted under 35 U.S.C. 154(b) by 0 days.

(21) Appl. No.: 11/320,365

(22) Filed: Dec. 28, 2005

(65) Prior Publication Data

US 2006/0143862 A1    Jul. 6, 2006

Related U.S. Application Data

(63) Continuation-in-part of application No. 10/962,945, filed on Oct. 12, 2004, now abandoned.

(51) Int. Cl.
    *B60B 33/04* (2006.01)
(52) U.S. Cl. .................................... 16/19; 16/30; 16/32
(58) Field of Classification Search ................ 16/19, 16/29, 30, 32–34, 37, 105
    See application file for complete search history.

(56) References Cited

U.S. PATENT DOCUMENTS

| | | | | |
|---|---|---|---|---|
| 1,835,144 A * | 12/1931 | Cleaveland | ..................... | 16/34 |
| 3,844,578 A * | 10/1974 | Matyskella et al. | ...... | 280/43.22 |
| 3,959,849 A * | 6/1976 | Marquardt | ..................... | 16/105 |
| 4,723,633 A * | 2/1988 | Duncan | ........................ | 182/230 |
| 4,805,260 A * | 2/1989 | Tooth | ............................. | 16/37 |
| 4,918,783 A * | 4/1990 | Chu | ............................... | 16/19 |
| 5,457,849 A * | 10/1995 | Branson et al. | ................. | 16/19 |
| 5,745,951 A * | 5/1998 | Waner | ......................... | 16/31 R |
| 6,637,071 B2 * | 10/2003 | Sorensen | ....................... | 16/32 |
| 6,810,561 B1 * | 11/2004 | Liu | .............................. | 16/42 T |
| 2001/0042286 A1 * | 11/2001 | Henriott et al. | ................ | 16/29 |
| 2003/0061681 A1 * | 4/2003 | Plate | ............................. | 16/19 |

* cited by examiner

*Primary Examiner*—Robert J Sandy
*Assistant Examiner*—Ruth C Rodriguez
(74) *Attorney, Agent, or Firm*—Patzik, Frank & Samotny Ltd.

(57) ABSTRACT

An adjustable caster comprising a reversible mounting bracket offering added flexibility in adjusting the height of the caster and configured to removably attach to a structure to be supported by the adjustable caster; an internally threaded sleeve mounted to and extending from the mounting bracket, the sleeve having proximal and distal ends and a sleeve axis extending there between; an externally threaded stem configured to be removably threaded into the sleeve at either the distal or proximal end; a caster wheel assembly attached to the stem; and an adjustment assembly operatively associated with the stem and fully accessible to a user of the caster when the caster is assembled and the mounting bracket is attached to the caster-supported structure, the vertical adjustment assembly configured to adjust the vertical displacement of the stem along the sleeve axis.

12 Claims, 10 Drawing Sheets

ADJUSTABLE CASTER AND LEVELING ASSEMBLY

PRIORITY CLAIM

This application is a continuation-in-part of application Ser. No. 10/962,945, filed on Oct. 12, 2004 now abandoned.

FIELD OF THE INVENTION

The present invention relates to a heavy-duty caster and leveling assembly, particularly useful in connection with the food service industry for use in connection with food preparation equipment where height adjustment of individual casters supporting a piece of equipment is necessary for level cooking and food preparation surfaces.

BACKGROUND OF THE INVENTION

Casters find widespread usage across a vast range of industries requiring that equipment and materials be easily moved from place to place. Casters are available in a number of designs, each addressing a specific purpose or need. Common examples of light-duty casters are those used on shopping carts and office chairs. Heavy-duty casters are used to move bulk materials and heavy equipment. Casters used in both light and heavy-duty applications are available as swivel casters and straight-line or rigid casters.

In most instances, the ability to vary the height of the caster is not critical to the operation of the structure being supported by the caster. However, in the food service industry there is a special need for level food preparation, storage, and cooking surfaces, including range tops, ovens, refrigerators and preparation tables. For example, the following undesirable situations may result from unleveled kitchen equipment:

1) Unleveled refrigeration creates air gaps in doors and prohibits proper cooling, excessive energy costs, and potential spoilage;
2) Unleveled convection ovens create gaps in the door seals resulting in uneven and incomplete baking; and
3) Unleveled ranges result in the burners not heating evenly and creating "hot" spots in pots and pans.

Additionally, health codes require that commercial kitchens maintain strict standards of cleanliness and sanitation. Commercial kitchens ordinarily include drains and troughs for complete drainage of water and/or cleaning solutions from cleaning and sanitation of the cooking process or water and/or liquids from the cooking process. Accordingly, commercial kitchen floors are almost never level, drains and troughs notwithstanding, and usually have a series of slopes and/or grades. The vertical displacement and leveling mechanism must be easily accessible to a maintenance worker or installation person for adjustment purposes to account for unlevel kitchen floors.

The health codes requiring that heavy kitchen appliances be moved with regularity for cleanliness standards also will, in turn, require that the caster itself used to move the appliance also be easily accessible for cleaning. An accumulation of grease and other food particles will attract insects, molds and/or other vermin that will lead to unsanitary conditions, as well as creating a fire hazard. Accordingly, the adjustable caster for commercial kitchen appliances must be devoid of spaces, chambers, and parts where such matter can accumulate.

SUMMARY OF THE INVENTION

In a preferred embodiment, the present invention caster comprises a mounting bracket configured to be removably attached to a structure to be supported by the vertically adjustable caster. An internally threaded sleeve is mounted to and extends from the mounting bracket. The sleeve has proximal and distal ends with a sleeve axis running there between. The sleeve comprises an aperture at the distal end and an aperture at the proximal end concentric with a bore in the plate. The caster further comprises an externally threaded stem configured to be removably threaded into the sleeve at either the proximal or distal end of the sleeve, and a caster wheel assembly attached to the stem.

An adjustment assembly is operatively associated with the stem and is fully accessible to a user of the caster when the caster is assembled and the mounting bracket is attached to the structure to be supported by the caster. The adjustment assembly is configured to adjust the displacement of the stem along the sleeve axis. The adjustment assembly comprises a locking member configured to be threaded onto the stem and an adjustment member operatively associated with the stem. Both the locking member and adjustment member are accessible to the user of the caster when the caster is assembled and the mounting bracket is mounted to the structure to be supported by the caster. The locking member bears against the distal end of the sleeve to restrict rotation of the stem relative to the sleeve.

In another preferred embodiment, the present inventive caster includes an adapter assembly for converting a plated caster into an adjustable caster. The plated caster comprises a base plate for mounting the plated caster to the structure to be supported by the caster, caster wheel mounting forks mounted to the base plate, and a caster wheel rotatably mounted on an axle received and restrained by the mounting forks. The adapter assembly comprises an adapter having a top surface and a bottom surface, and configured to removably mate to a top surface of the base plate. The adapter further comprises a threaded stem mounted to and extending from the top surface.

A mounting bracket is configured to removably attach to the structure to be supported by the caster and comprises an internally threaded sleeve mounted to and extending from the mounting bracket. The sleeve has a proximal and a distal end and an axis running from the proximal to the distal end. The sleeve further comprises an aperture at the distal end and an aperture at the proximal end concentric with a bore in the plate.

An adjustment assembly is operatively associated with the stem and fully accessible to the user of the caster when the caster is assembled and the mounting bracket is attached to the structure to be supported by the caster. The adjustment assembly is configured to adjust the vertical displacement of the stem along the sleeve axis. The adjustment assembly comprises a locking nut configured to be threaded onto the stem and accessible to the user of the caster when the caster is assembled and the mounting bracket is mounted to the structure to be supported by the caster. The locking member bears against the distal end of the sleeve to prevent rotation of the stem relative to the sleeve.

DETAILED DESCRIPTION OF THE DRAWINGS

Figure 1:
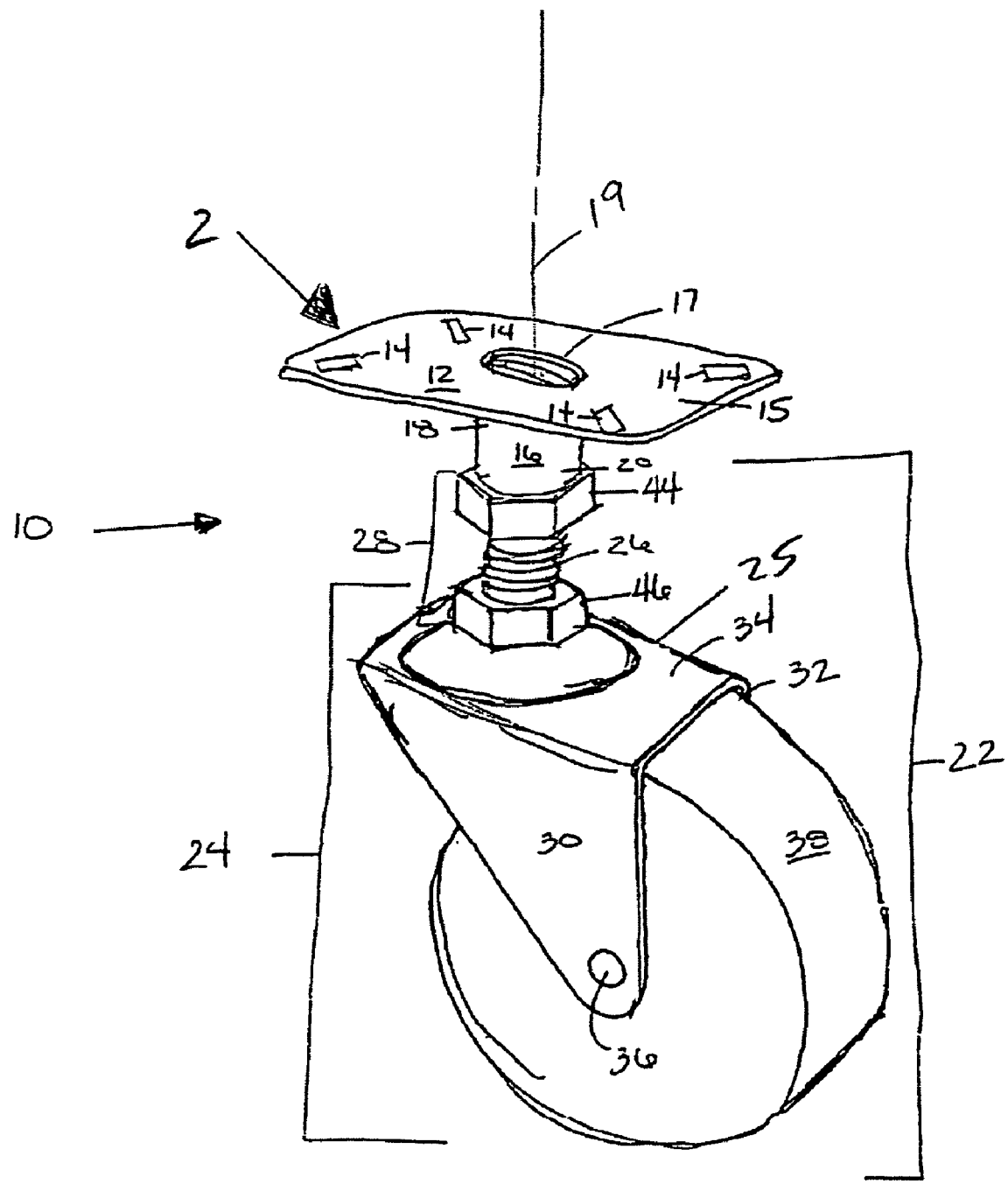
FIG. 1 shows a perspective view of an exemplary embodiment of an adjustable caster according to the present invention.
Figure 2:
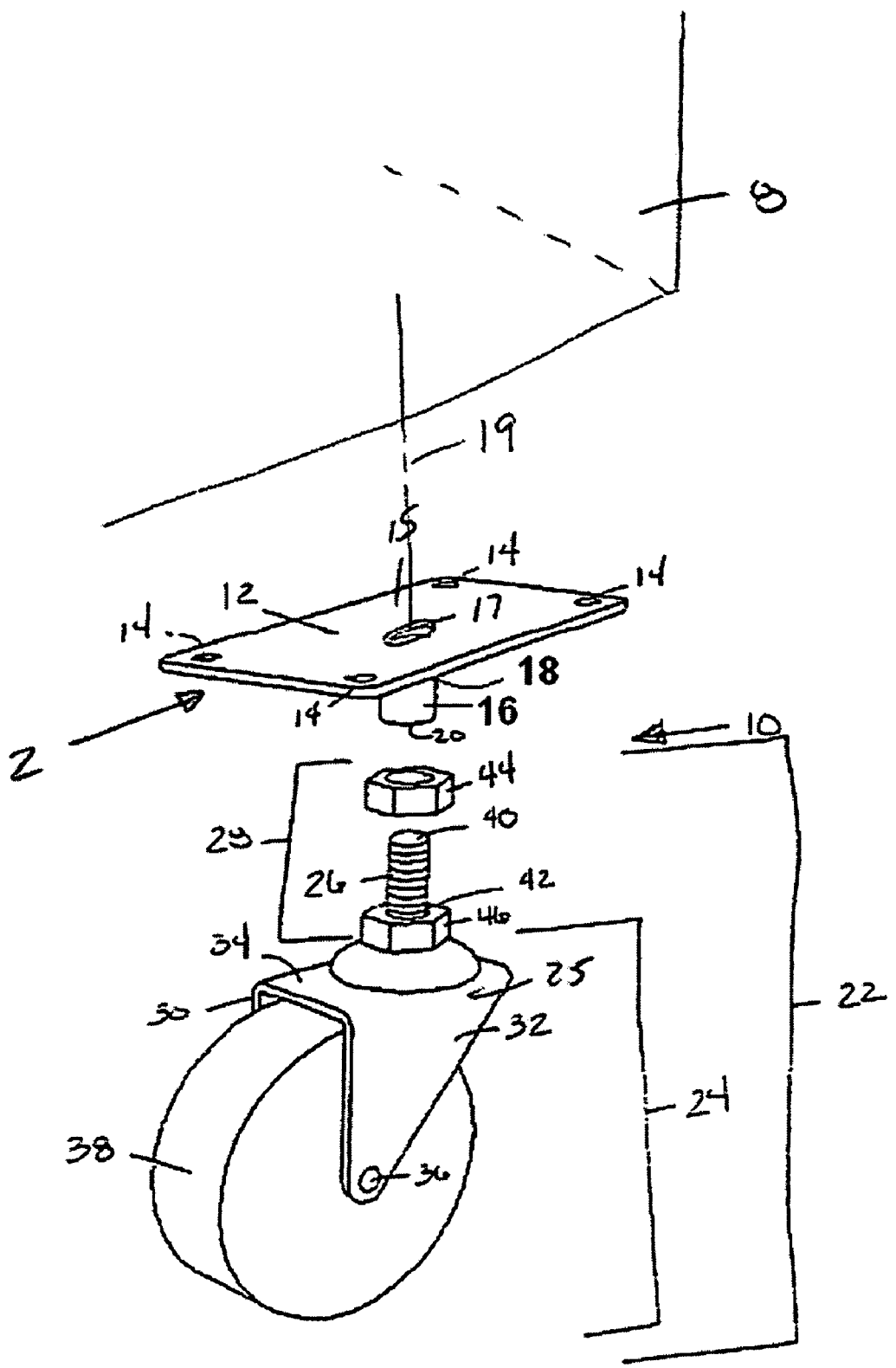
FIG. 2 shows an exploded perspective view of the adjustable caster of FIG. 1.
Figure 3:
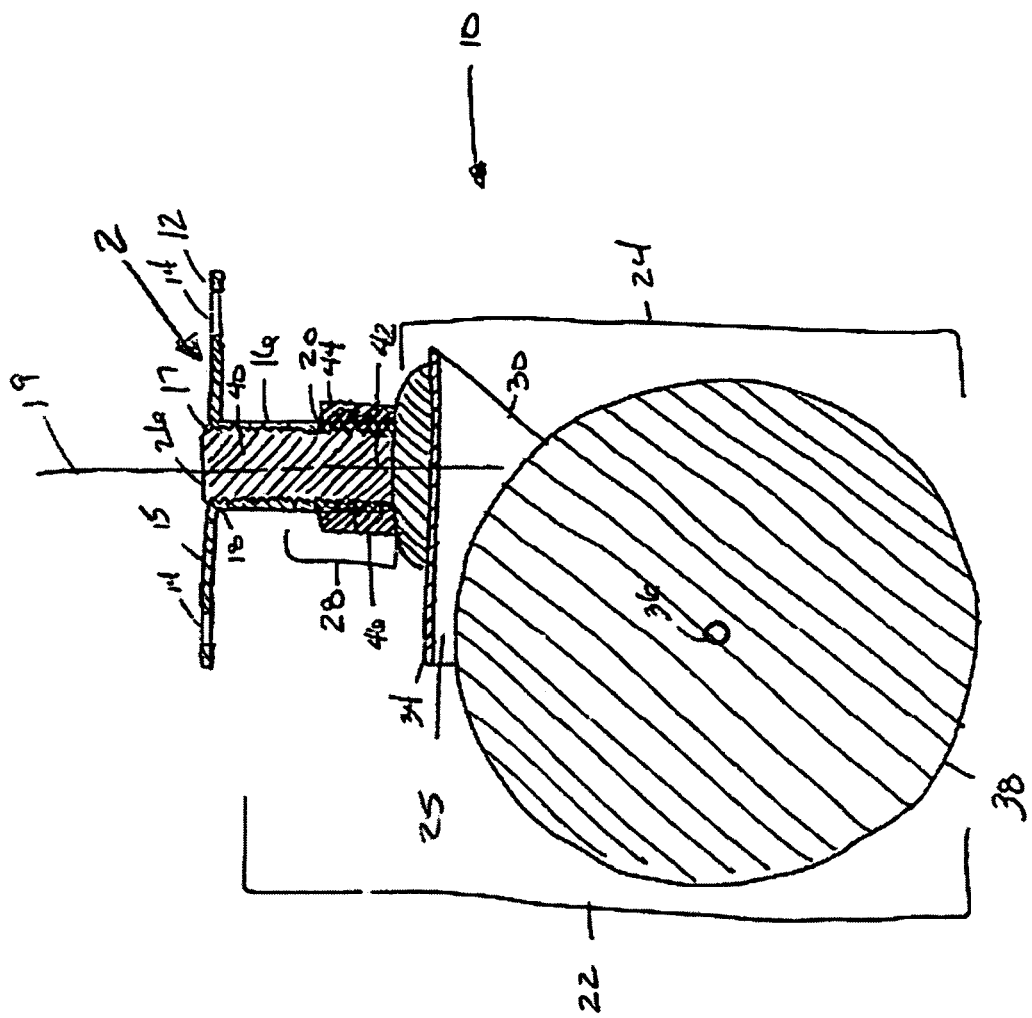
FIG. 3 shows a cross-sectional elevation view of the adjustable caster of FIG. 1.
Figure 4:
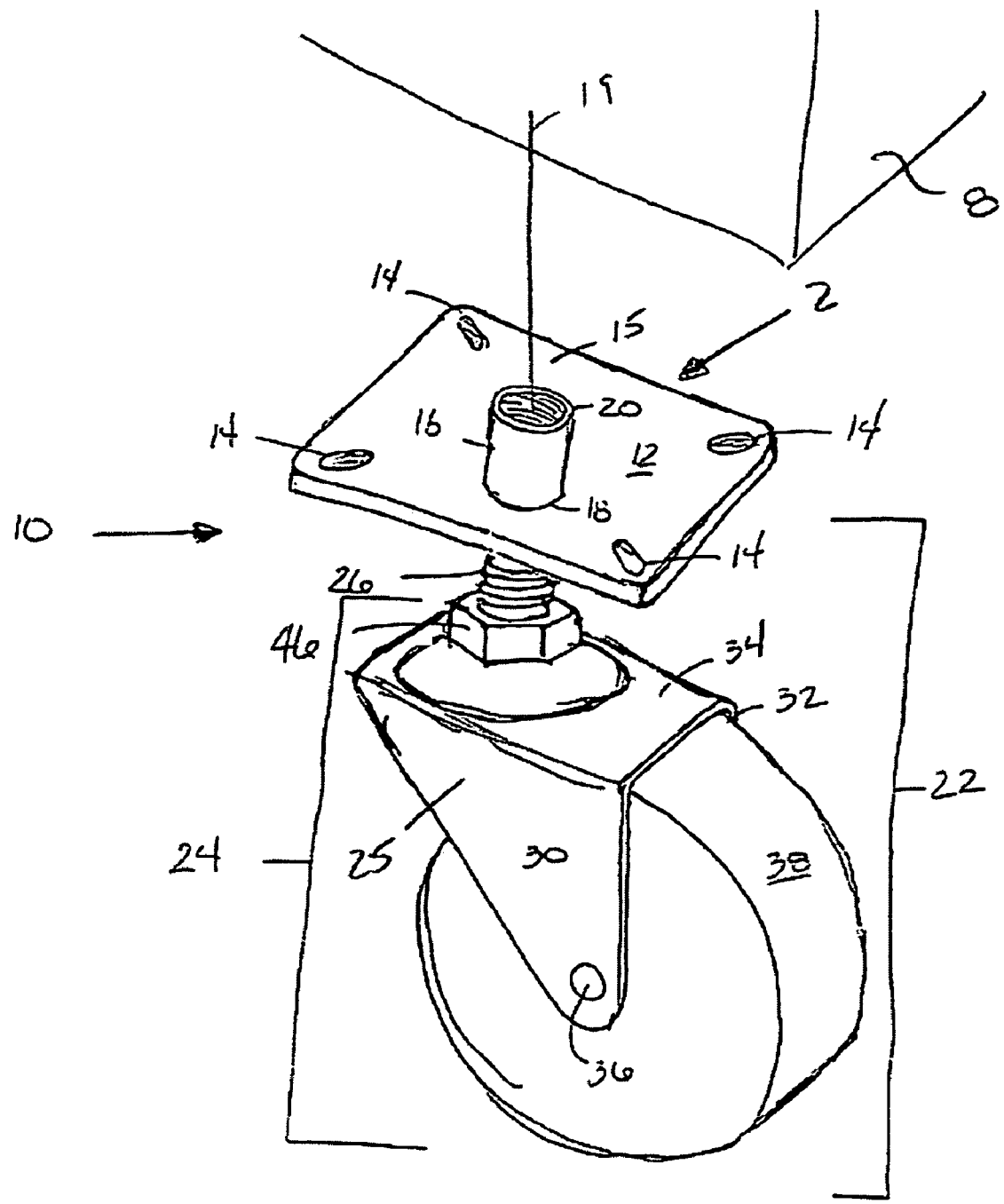
FIG. 4 shows a perspective view of a second exemplary embodiment of an adjustable caster according to the present invention.
Figure 5:
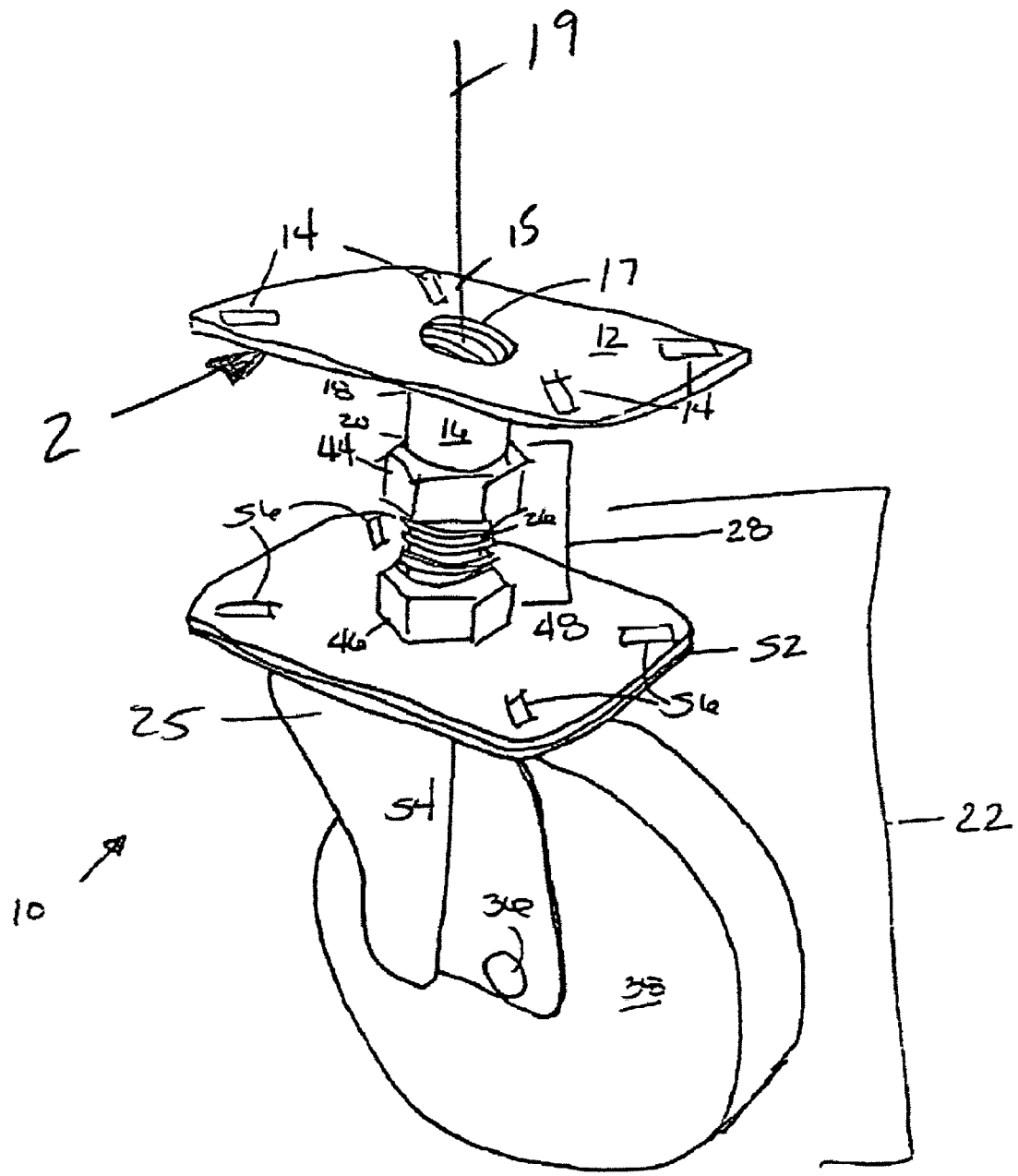
FIG. 5 shows a perspective view of a third exemplary embodiment of an adjustable caster according to the present invention.
Figure 6:
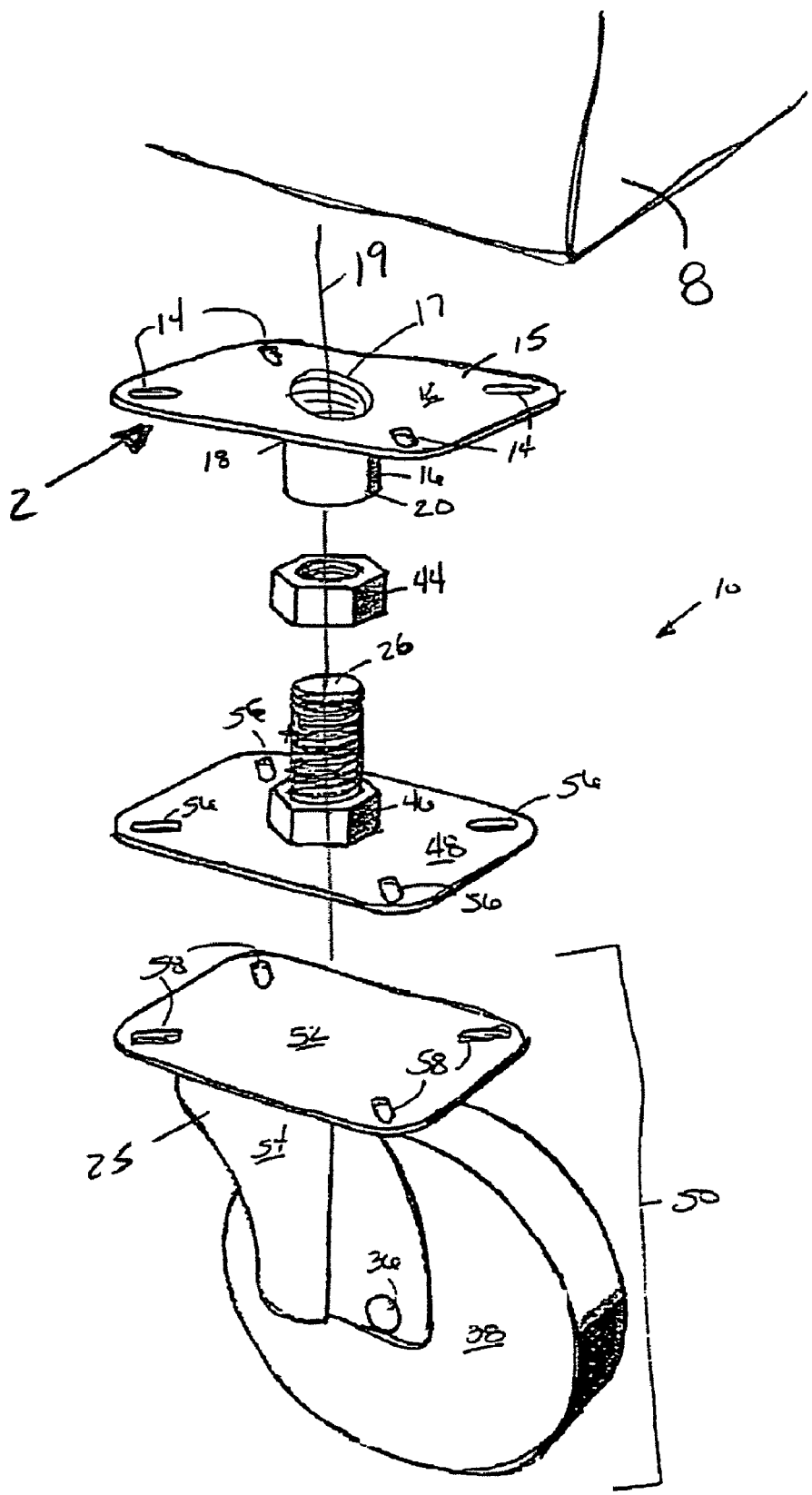
FIG. 6 shows an exploded perspective view of the adjustable caster of FIG. 5.
Figure 7:
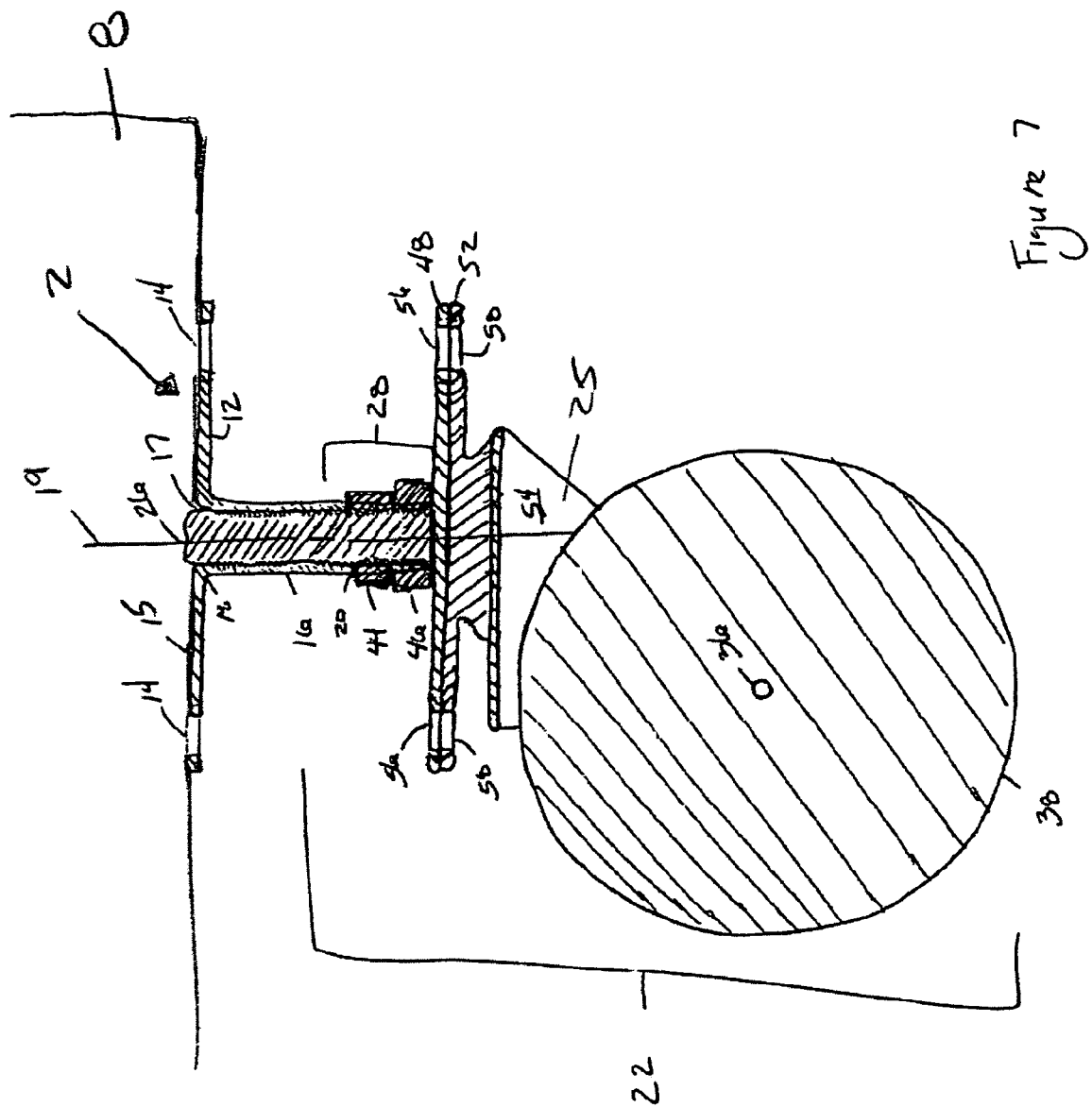
FIG. 7 shows a cross-sectional elevation view of the adjustable caster of FIG. 5.
Figure 8:
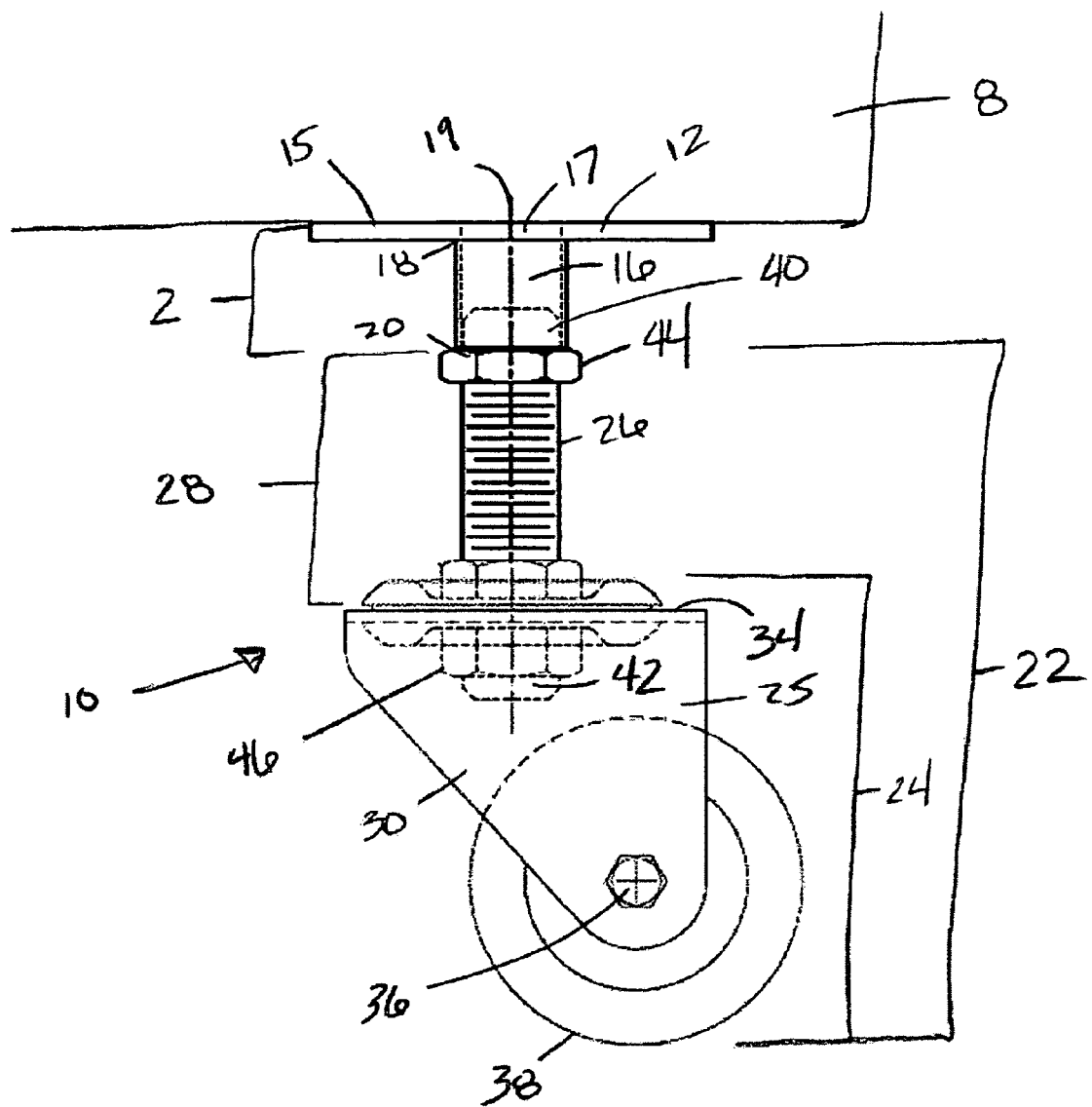
FIG. 8 shows a front elevation view of a fourth exemplary embodiment of an adjustable caster according to the present invention.
Figure 9:
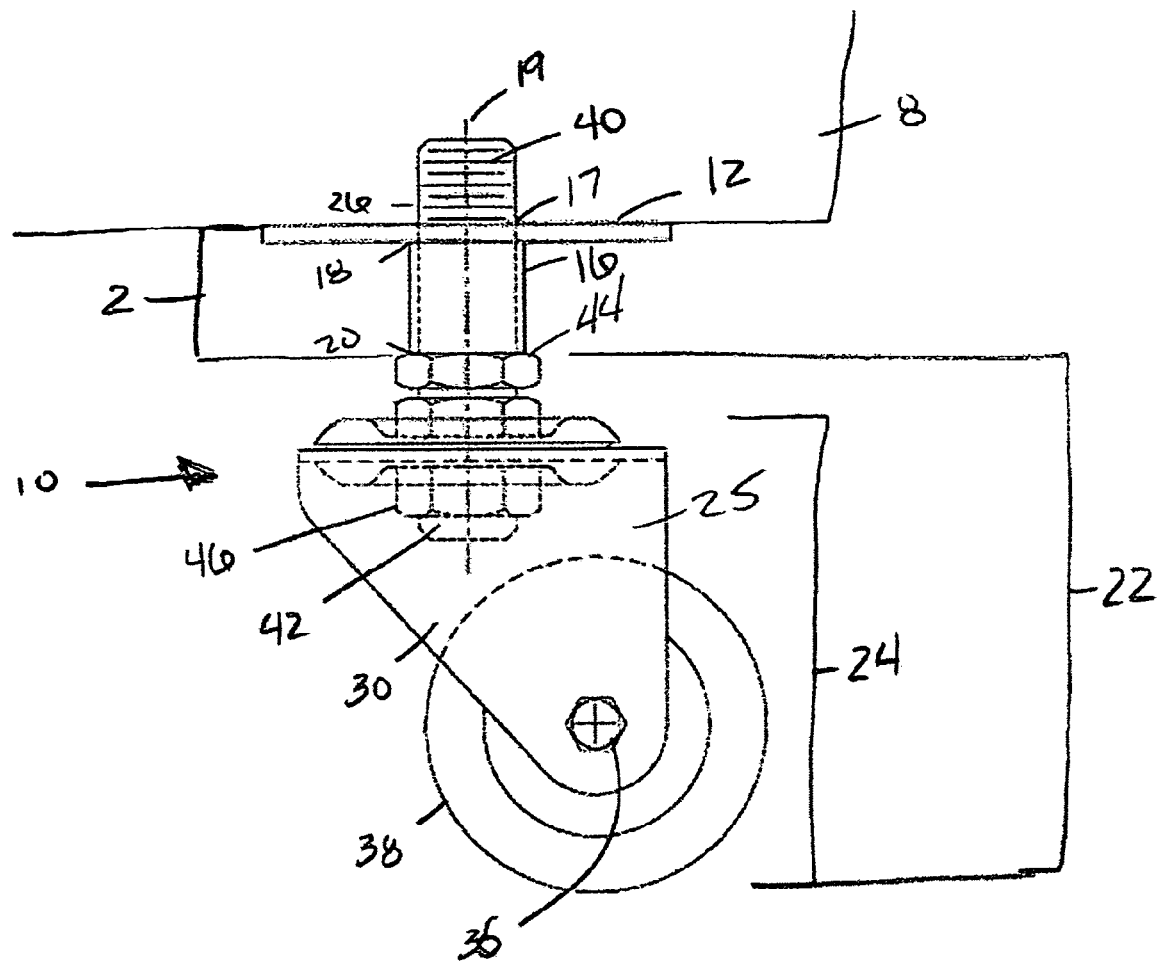
FIG. 9 shows a front elevation view of the fourth exemplary embodiment of the adjustable caster of FIG. 8 in a second position.
Figure 10:
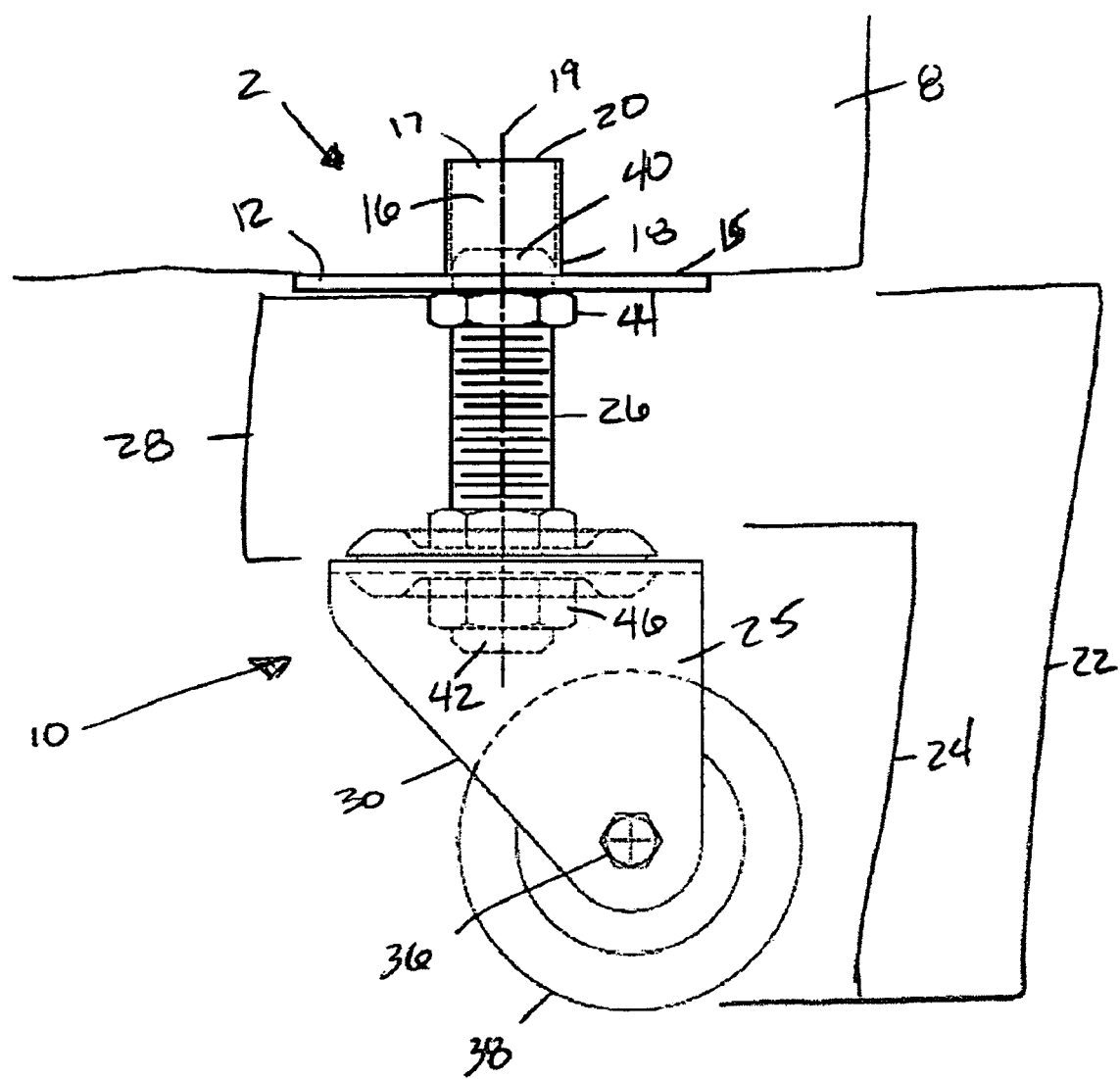
FIG. 10 show a front elevation view of the fourth exemplary embodiment of the adjustable caster of FIG. 8 in a second configuration.

FIGS. 1-10 show exemplary embodiments of an inventive, vertically adjustable caster assembly, the assembly comprising the following sub-assemblies, a mounting assembly 2, a caster wheel assembly 24, comprising either a swiveling caster or a non-swiveling caster, an interface 26 interconnecting the mounting assembly 2 and the caster wheel assembly 24, and an adjustment assembly 28 for adjusting the height of the mounting assembly 2 with respect to the caster wheel assembly 24. FIGS. 1-3 show a first exemplary embodiment comprising a complete caster assembly according to the present invention. FIG. 4 shows a second exemplary embodiment comprising a complete caster assembly according to the present invention. FIGS. 5-7 show a third exemplary embodiment comprising an adapter assembly for converting a plated caster into a vertically adjustable caster according to the present invention. FIG. 8-10 show a fourth preferred embodiment of the inventive adjustable caster assembly. Wherever possible, common reference numbers are used to identify like components present in all embodiments described herein.

Turning first to FIGS. 1-3, the mounting assembly 2 comprises a reversible mounting bracket 12 in which apertures 14 are defined for attaching the mounting bracket 12 to the caster-supported structure 8. The caster-supported structure 8 consists of a piece of kitchen equipment such as an oven, range top, refrigerator, food preparation surface or other kitchen equipment having a horizontal operational surface, where a level operational surface is critical to proper operation. The mounting bracket 12 comprises a plate 15 having a top and bottom surface and a sleeve 16 mounted to and extending from the bottom surface of the mounting bracket 12. The sleeve could be originally formed as part of the mounting plate 15 or alternatively it could be welded or otherwise securely affixed to the mounting plate 15. The sleeve 16 includes a proximal end 18 near the mounting bracket 12, and a distal end 20 opposite the proximal end 18. In this exemplary embodiment of the present invention, the sleeve 16 further includes internal threads, though other methods of affixing the stem 26 to the sleeve 16 in such a way as to allow vertical adjustment are contemplated, as well.

A bore 17 in the mounting plate 12 is concentric with an aperture at the proximal end 18 of the sleeve 16 and enables communication with the sleeve 16 through the plate 15. The distal end 20 of the sleeve also includes an aperture enabling communication with the interior of the sleeve 16. A sleeve axis 19 runs from the proximal end 18 to the distal end 20 of the sleeve 16. While in this embodiment, the sleeve 16 is mounted substantially perpendicular to the plate 15, it is understood that the sleeve 16 can be mounted to the plate 15 at various angles resulting in a sleeve axis that is angled with respect to vertical, so long as adjustment in accordance with the invention as described herein is enabled.

A lower assembly 22 comprises a caster wheel assembly 24, an interface comprising a stem 26 and an adjustment assembly 28. The caster wheel assembly 24 includes a wheel bracket 25 comprising first and second caster arm 30, 32 connected by a web 34. The caster arms 30, 32 extend downwardly from opposite sides of the web 34 in parallel, spaced relationship to each other. An axle 36 extending between the first and second caster arms 30, 32 rotatably supports a caster wheel 38 in the caster wheel space defined by the caster arms 30, 32 and web 34.

The stem 26 includes a first end 40 (shown in FIG. 2), with external threading along its length, configured to removably engage the internal threads of the sleeve 16, and a second end 42 attached to the top surface of the web 34. In this manner, the stem 26 interconnects the lower assembly 22 and the mounting bracket 12. In other exemplary embodiments of the present inventive vertically adjustable caster, the stem and sleeve may be mated by any means suitable to enable the stem to be removably and adjustably mated to the sleeve.

The adjustment assembly 28 comprises a locking member 44, comprising a locking nut, and an adjustment member 46. The locking nut 44 is configured to be threaded onto the stem 26. The adjustment member 46 is operatively associated with the second end 42 of the stem 26. Preferably, the adjustment member 46 is a nut that is welded or otherwise secured into place. In this manner, the adjustment member 46 acts as a secure grip for a user to make adjustments to the height of the caster wheel assembly 24 with respect to the mounting assembly 2, as will be described below. The user may grip the adjustment member 46 by hand or with a wrench or pliers. Without the presence of the adjustment member 46, the user is required to grab the stem 26 or the rotatable caster wheel assembly 24 to adjust the caster 10. It is contemplated that in other preferred embodiments, the adjustment member 46 can comprise a structure that is securely mounted to the web 34 and provides a point of secure attachment of the stem 26.

One feature of the present invention is that the locking nut 44 and adjustment member 46 are always accessible to the user of the caster 10. The user does not need to disassemble any portion of the caster 10 to either adjust the vertical displacement of the caster 10 or clean the components of the caster 10.

The adjustment assembly 28 is configured to adjust the displacement of the caster wheel assembly 24 along the sleeve axis 19 defined by proximal and distal ends 18, 20 of the sleeve 16. To secure the caster wheel assembly 24 at a desired displacement, the locking member 44 bears against the distal end 20 of the sleeve 16 so as to restrict rotation of the stem 26 relative to the sleeve 16.

If the user desires to change the displacement of the caster wheel assembly 24, the locking nut 44 is loosened and the stem 26 is rotated at the adjustment member 46 relative to the mounting bracket 12. As previously described, the adjustment member 46 gives the user a convenient place to grab the lower assembly 22 for purposes of adjusting the height of the castor 10 by hand or with a hand tool such as a pliers or wrench. This rotation of the stem 26 will further thread or unthread the first end 40 of the stem 26 within the sleeve 16, thereby changing the displacement of the caster wheel assembly 24 along a vertical axis. To secure the caster wheel assembly 24 in its new position, the locking nut 44 is returned to a position whereby it bears against the distal end 20 of the sleeve 16.

FIG. 4 shows a second exemplary embodiment of the inventive caster demonstrating the ability of the user to flip the reversible mounting bracket 12 over and assemble the caster 10. In this manner, the mounting bracket 12 is configured to attach to the caster supported structure 8 in a first position enabling access to the sleeve 16 through the distal end 20 of the sleeve and a second position enabling access to the sleeve 16 through the proximal end 18 of the sleeve. The bore 17 is configured to enable the first end 40 of the stem 26 to thread into the proximal end 18 of the sleeve 16. In this embodiment, a bore must also be cut into the caster-supported structure 8 to receive the distal end 20 of the sleeve 16.

When the mounting plate 12 is in the reversed state, the overall caster height can be reduced by the height of the sleeve 16. This flexibility enables the same caster components to be used in multiple situations requiring the use of vertically adjustable casters. In this embodiment, the locking nut 44 bears against the top surface of the mounting bracket 12 to restrict unwanted threading of the stem 26 into or out of the sleeve 16.

FIGS. 5-7 show a third exemplary embodiment of the present invention. This preferred embodiment includes an adapter 48 for converting a plated caster 50 into a vertically adjustable caster 10 according to the present invention. The plated caster 50 comprises a base plate 52, a caster wheel mounting fork 54 mounted to the base plate 52, and a caster wheel 38 mounted on an axle 36 spanning the caster wheel space in the mounting fork 54.

The adapter 48 is sized with approximately the same dimensions as the base plate 52 and includes apertures 56 for fastening the adapter 48 to corresponding apertures 58 in the base plate 52. The apertures 56 are angled slots that offer multi-position mounting capabilities. An externally threaded stem 26, with a first end 40 and a second end 42, is mounted to the top surface of the adapter 48 and extends upwards from the adapter 48. The second end 42 of the stem 26 is welded to the top surface of the adapter 48. Together, the adapter 48, stem 26, and plated caster 50 comprise the lower assembly 22 of the inventive caster 10.

A reversible mounting bracket 12, similar to the reversible mounting bracket described in the previous embodiments, includes apertures 14 for attaching the mounting bracket 12 to the caster-supported structure (not shown). The mounting bracket 12 includes an internally threaded sleeve 16 mounted to and extending from the bottom surface of the mounting bracket 12.

The sleeve 16 includes a proximal end 18 near the mounting bracket 12 and a distal end 20 opposite the proximal end 18. A sleeve axis 19 runs from the proximal 18 to the distal 20 end of the sleeve 16. A bore 17 in the mounting plate 12 is concentric with an aperture at the proximal end 18 of the sleeve 16 and enables communication with the sleeve 16 through the mounting plate 12. The distal end 20 of the sleeve also includes an aperture enabling communication with the interior of the sleeve 16. The first end 40 of the stem 26 is configured to removably engage the internal threads of the sleeve 16 through both the proximal and distal ends 18, 20 of the sleeve 16. In this manner, the stem 26 interconnects the lower assembly 22 and the mounting bracket 12.

A vertical adjustment assembly 28, comprising a locking nut 44 and an adjustment member 46, is operatively associated with the stem 26. The locking nut 44 is configured to be threaded onto the stem 26. Preferably, the adjustment member 46 is a nut that is threaded to the lower portion 40 of the stem 26 and welded or otherwise secured into place. In this manner, the adjustment member 46 acts as a secure grip for a user to make adjustments to the height of the caster 10, as will be described below. The user may grip the adjustment nut 46 by hand or with a wrench or pliers. Without the presence of the adjustment nut 46, the user is required to grab the stem 26 or the rotatable caster wheel assembly 24 to adjust the caster 10. As has been described with the other embodiments of the present invention, it is contemplated that the adjustment member can take other forms in addition to that described above, provided the adjustment member provides the user of the caster with a convenient grip portion to adjust the height of the caster.

One feature of the present invention is that the locking nut 44 and adjustment member 46 are always accessible to the user of the caster 10. The user does not need to disassemble any portion of the caster 10 to either adjust the vertical displacement of the caster or clean the components of the caster.

The vertical adjustment assembly 28 is configured to adjust the vertical displacement of the original plated caster 50 along the sleeve axis 19 defined by the proximal and distal ends 18, 20 of the sleeve 16. To secure the caster 50 at a desired vertical displacement, the locking nut 44 bears against the distal end 20 of the sleeve 16 to restrict rotation of the stem 26 relative to the sleeve 16.

If the user desires to change the vertical displacement of the caster 50, the locking nut 44 is loosened and the lower assembly 22, including the stem 26 and caster 50, is rotated relative to the mounting bracket 12. This rotation will further thread or unthread the stem 26 within the sleeve 16, thereby changing the displacement of the caster 50. To secure the caster 50 in its new position, the locking nut 44 is returned to a position whereby it bears against the distal end 20 of the sleeve 16. As previously described, the adjustment member 46 gives the user a convenient place to grab the lower assembly 22 for purposes of adjusting the height of the castor 10.

The reversible mounting bracket 12 can be flipped over, as shown in FIG. 4, to enable the user to reduce the overall height of the caster by the height of the sleeve 16. As was stated in connection with the other exemplary embodiments, in this manner, the mounting bracket 12 is configured to attach to the caster supported structure in a first position enabling access to the sleeve 16 through the distal end 20 of the sleeve and a second position enabling access to the sleeve 16 through the proximal end 18 of the sleeve. When the mounting bracket 12 is mounted to the caster-supported structure in the reversed configuration, a bore 17 must be cut into the caster-supported structure to receive the distal end 20 of the sleeve 16 upon assembly. The stem 26 is threaded into the sleeve 16 at the proximal end 18 through the bore 17 in the mounting plate 12.

FIGS. 8-10 show a fourth preferred embodiment of the present invention. As is shown in FIG. 8, the second end 42 of the stem 26 extends below the web portion 34 of the wheel bracket 25. Accordingly, the adjustment member 46, which in this embodiment comprises a nut permanently attached to the stem 26, is accessible to the user of the adjustable caster assembly by reaching beneath the web portion of the wheel bracket 25 with the appropriate tool. This provides for additional displacement, with respect to the embodiment previously described, of the stem 26 within the sleeve 16 because the width of the adjustment member 46 is moved to below the web 34. This arrangement also provides for ease of adjustment of the assembly 10 when a fascia or curb mount on the piece of equipment 8 to be leveled otherwise precludes or limits access to components of the assembly above the caster wheel assembly 24. The procedure for adjusting the displacement of the caster wheel assembly 24 with respect to the mounting assembly 2 and locking the caster wheel assembly 24 into position is the same as with the embodiments of the present invention previously described herein.

FIG. 9 shows the embodiment of the adjustable caster assembly 10 shown in FIG. 8 with the stem 26 completely received by the sleeve 16, with the first end 40 of the stem 26 protruding through the bore 17 in the plate 15. FIG. 10 shows the adjustable caster of this embodiment with the reversible mounting bracket 12 placed in a second position, where the sleeve 16 is received by the caster-supported structure 8. In this configuration, the total displacement of the stem 26 is reduced by the length of the sleeve 16. In this embodiment, the bore 17 serves as the initial receiving end of the shaft 16 when the mounting bracket 12 receives the stem 26.

It will be understood that modifications and variations may be effected without departing from the spirit and scope of the present invention. It will be appreciated that the present disclosure is intended as an exemplification of the invention and is not intended to limit the invention to the specific embodiments illustrated and described. The disclosure is intended to cover, by the appended claims, all such modifications as fall within the scope of the claims.

We claim:

1. An adjustable caster for supporting a structure above a floor and for leveling an operational surface of the structure relative to the floor, the caster capable of adjustment while attached to and supporting the structure, comprising:
    a) a mounting assembly attached to the structure;
    b) a stem comprising a first and second end, the first end configured to be removably and adjustably attached to the mounting assembly;
    c) a caster wheel assembly operatively associated with the second end of the stem, the castor wheel assembly comprising a wheel and a wheel bracket; and
    d) an adjustment assembly operatively associated with the stem and accessible to a user of the adjustable caster when the adjustable caster is assembled and attached to the caster supported structure, the adjustment assembly configured to adjust the displacement of the stem relative to the mounting assembly and, in turn the displacement of the caster wheel assembly relative to the mounting assembly and the displacement of the supported structure relative to the floor, the adjustment assembly comprising an adjustment member operatively associated with the second end of the stem and disposed on the stem below the wheel bracket, the adjusting member being manipulable to permit adjustment of the displacement of the caster wheel assembly relative to the mounting assembly and the supported structure and, in turn, to level the operational surface relative to the floor when the caster is attached to and supporting the structure, the wheel remaining in operable contact with the floor when the operational surface has been leveled by manipulation of the adjustment member, and a locking member configured to be operatively attached to the first end of the stem,
    wherein the mounting assembly comprises a mounting bracket comprising: a plate having a top and bottom surface, the plate configured to removably attach to the structure to be supported by the adjustable caster; and a sleeve comprising a proximal end mounted to and extending from the bottom surface of the plate, a distal end, and a sleeve axis extending between the proximal and distal ends, and wherein the adjustment assembly is configured to adjust the displacement of the stem along the sleeve axis.

2. The adjustable caster of claim 1 wherein the sleeve comprises internal threads and wherein the stem comprises external threads corresponding to the internal threads of the sleeve and wherein the adjustment member comprises a nut permanently affixed to the stem to enable conjoint rotation of the adjustment member and stem, and the locking member comprises a nut threaded onto the stem and configured to travel in opposing directions on the stem.

3. The adjustable caster of claim 1 wherein the caster is adapted to support a piece of kitchen equipment having a horizontal operational surface, the horizontal operational surface requiring leveling for proper operation.

4. The adjustable caster of claim 1 wherein the caster wheel assembly comprises a plated caster comprising a base plate for mounting the plated caster to a structure to be supported by the caster, and a caster wheel mounted to the base plate, and wherein the adjustable caster further comprises an adapter having a bottom surface configured to removably mate to the base plate, and a top surface mounted to the second end of the stem.

5. The adjustable caster of claim 1 wherein the caster wheel assembly comprises a swiveling caster.

6. The adjustable caster of claim 1 wherein the mounting bracket is reversible and further comprises a bore extending from the top surface of the plate to the bottom surface of the plate and the sleeve is mounted to the bottom surface of the plate to be concentric with the bore, and the mounting bracket configured to attach to the caster supported structure in a first position enabling access to the sleeve through the distal end of the sleeve and a second position enabling access to the sleeve through the proximal end of the sleeve.

7. A method of supporting a structure having an operational surface above a floor with an adjustable caster and leveling the operational surface, the method comprising:
    a) providing a mounting bracket comprising a plate having a top and bottom surface and a sleeve comprising a proximal end mounted to and extending from the bottom surface of the plate, a distal end, and a sleeve axis extending between the proximal and distal ends;
    b) removably attaching the plate to the structure to be supported by the adjustable caster,
    c) removably inserting a first end of a stem to the sleeve along the sleeve axis;
    d) operatively attaching a caster wheel assembly to a second end of the stem, the caster wheel assembly comprising a wheel and a wheel bracket;
    e) providing an adjustment assembly operatively associated with the stem and accessible to a user of the adjustable caster, the adjustment assembly comprising an adjustment member operatively associated with the second end of the stem and disposed on the stem below the wheel bracket, and a locking member configured to be operatively attached to the first end of the stem;

f) attaching the caster to a surface of the supported structure such that the caster is disposed between the supported structure and the floor;

g) after attaching the caster to a surface of the supported structure, adjusting the displacement of the wheel bracket relative to the mounting bracket and, in turn, the displacement of the wheel bracket relative to the supported structure and the displacement of the supported structure relative to the floor by engaging the adjustment member below the wheel bracket and displacing the stem within the sleeve along the sleeve axis to level the operational surface, the wheel remaining in operable contact with the floor when the operational surface has been leveled by displacing the stem; and h) locking the caster height into position by displacing the locking member along the stem until the locking member abuts the distal end of the sleeve.

8. The method of claim 7 further comprising the steps of: a) providing the sleeve with internal threads; b) disposing external threading on the stem, the external threading corresponding to the internal threads of the sleeve; and wherein the adjustment member comprises a nut permanently affixed to the stem to enable conjoint rotation of the adjustment member and stem, and the locking member comprises a nut threaded onto the stem and configured to travel in opposing directions on the stem.

9. The method of claim 7 wherein the structure to be supported by the caster is a piece of kitchen equipment having a horizontal operational surface, the horizontal operational surface requiring leveling for proper operation.

10. The method of claim 7 wherein the caster wheel assembly comprises a plated caster comprising a base plate for mounting the plated caster to a structure to be supported by the caster, and a caster wheel mounted to the base plate, and wherein the adjustable caster further comprises an adapter having a bottom surface configured to removably mate to the base plate, and a top surface mounted to the second end of the stem.

11. The method of claim 7 wherein the caster wheel assembly comprises a swiveling caster.

12. The method of claim 7 further comprising the step of providing a reversible mounting bracket, the reversible mounting bracket comprising a bore extending from the top surface of the plate to the bottom surface of the plate and the sleeve is mounted to the bottom surface of the plate to be concentric with the bore, and the mounting bracket configured to attach to the caster supported structure in a first position enabling access to the sleeve through the distal end of the sleeve and a second position enabling access to the sleeve through the proximal end of the sleeve.

* * * * *

UNITED STATES PATENT AND TRADEMARK OFFICE
CERTIFICATE OF CORRECTION

PATENT NO.        : 7,350,269 B2                                               Page 1 of 1
APPLICATION NO.   : 11/320365
DATED             : April 1, 2008
INVENTOR(S)       : Dennis Paul Dominic and Joe Edwin Lucas It is certified that error appears in the above-identified patent and that said Letters Patent is hereby corrected as shown below:

Column 5

Line 3, replace "castor" with --caster--

Column 6

Line 47, replace "castor" with --caster--

Column 7

Line 47, replace "castor" with --caster--

Signed and Sealed this

Fifteenth Day of July, 2008

JON W. DUDAS
*Director of the United States Patent and Trademark Office*